United States Patent Office 3,336,999
Patented Aug. 22, 1967

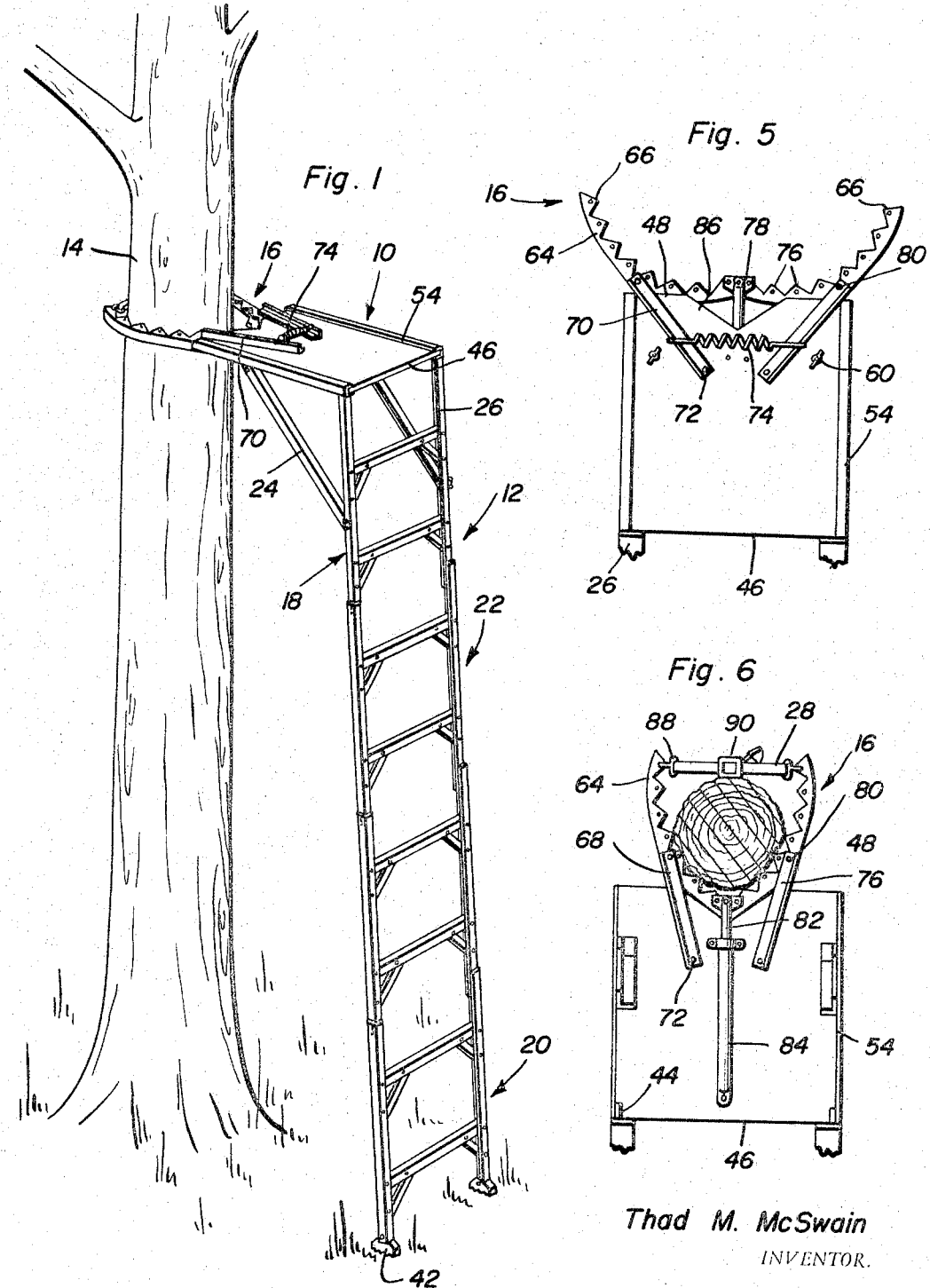

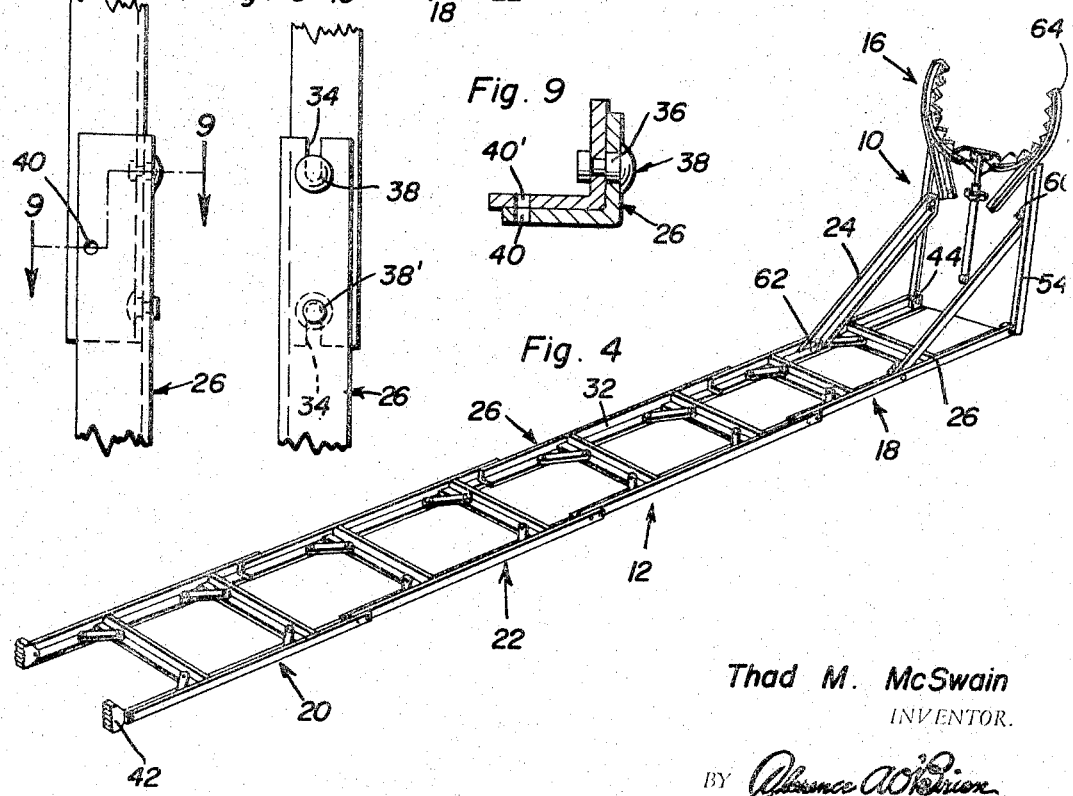

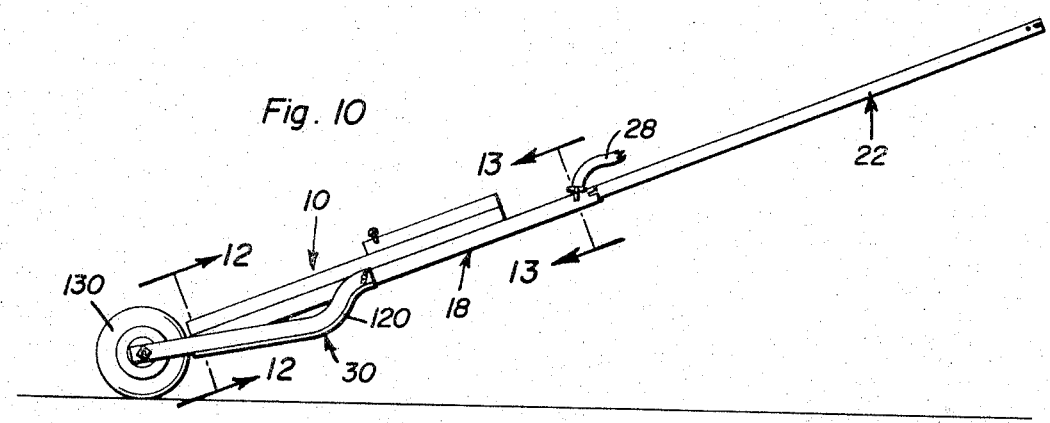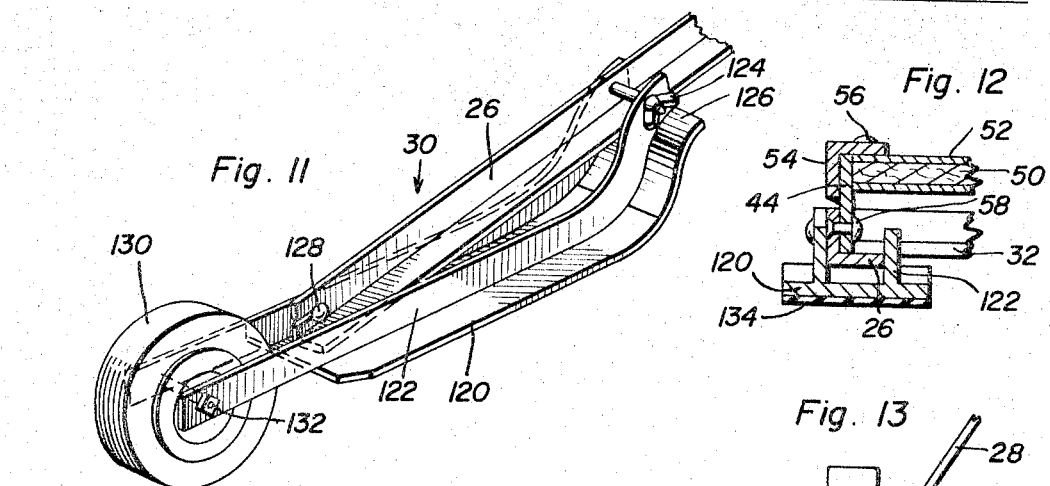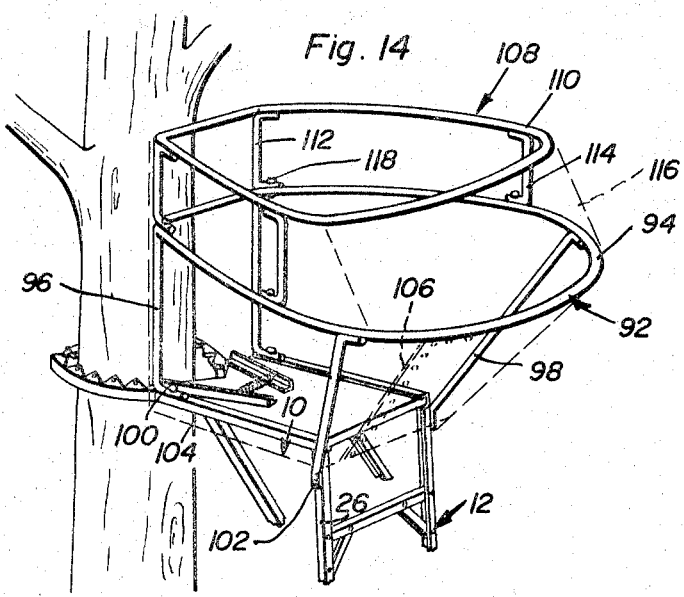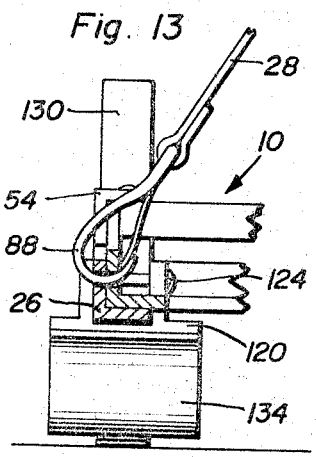

3,336,999
HUNTING STAND
Thad M. McSwain, 1912 S. Main St.,
Stuttgart, Ark. 72160
Filed Feb. 4, 1966, Ser. No. 525,263
9 Claims. (Cl. 182—20)

ABSTRACT OF THE DISCLOSURE

A ladder supporting a platform at its upper end while fastened to a tree trunk by a toggle operated clamp that grips when the platform is pushed against the tree trunk. The assembly may be converted into a litter supported by skids or wheels on the ground or collapsed into compact form for transport purposes.

---

This invention relates to a collapsible and convertible type of hunting stand for sportsmen.

A primary object of the present invention is to provide a hunting stand for sportsmen which may be easily and rapidly assembled from parts capable of being collapsed and stored in an extremely compact form.

An additional object of the present invention is to provide a hunting stand which is assembled on the ground and erected by displacing the assembly against a tree automatically clamping it to the tree.

A further object of the present invention in accordance with the foregoing object, is to provide a hunting stand platform having a tree clamping jaw assembly which is opened prior to erection of the hunting stand so that when the platform is pushed against the tree, the jaw assembly snaps to a clamping position grippingly embracing the tree trung in order to firmly hold the platform in its elevated position on top of a ladder assembly.

Yet a further object of the present invention is to provide in combination with a hunting platform, a ladder assembly made of a plurality of sections which are easily assembled or disassembled and which may also be converted into a litter carrying device with the platform folded thereagainst when skid elements or wheel assemblies are attached thereto in order to transport equipment or game. A strap device is accordingly provided not only to secure the game or equipment to the ladder assembly which forms the litter device but to also prevent separation of the ladder sections when they are being used as part of the litter device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing some of the basic components of the present invention being utilized as a hunting stand.

FIGURE 2 is a perspective view showing one side of the collapsed assembly of parts of the present invention in a storage arrangement.

FIGURE 3 is a front elevational view showing the collapsed assembly of parts as viewed from the side opposite that shown in FIGURE 2.

FIGURE 4 is a perspective view showing the assembly of components which form the basic hunting stand prior to vertical erection.

FIGURE 5 is a top plan view of the platform component of the hunting stand with the jaw assembly in an open position.

FIGURE 6 is a bottom plan view of the platform with the jaw assembly in a closed clamping position engaging a tree trunk.

FIGURE 7 is an enlarged side elevational view of the overlapping portions of two ladder sections forming part of the ladder assembly.

FIGURE 8 is a front elevational view of the portion of the ladder assembly shown in FIGURE 7.

FIGURE 9 is a sectional view taken substantially through a plane indicated by section line 9—9 of FIGURE 7.

FIGURE 10 is a side elevational view showing the hunting stand converted into a litter carrying device.

FIGURE 11 is a perspective view showing one of the wheel assemblies associated with the litter carrying device of FIGURE 10.

FIGURE 12 is an enlarged partial sectional view taken substantially through a plane indicated by section line 12—12 in FIGURE 10.

FIGURE 13 is an enlarged partial sectional view taken substantially through a plane indicated by section line 13—13 in FIGURE 10.

FIGURE 14 is a perspective view showing the mounting of an enclosure on top of the hunting stand in accordance with the present invention.

Referring now to the drawings in detail, FIGURE 1, illustrates the formation of a hunting stand from some of the basic components which form the present invention including a platform component generally referred to by reference numeral 10 supported in a horizontal, and elevated position above the ground by means of a ladder assembly generally referred to by reference numeral 12. The platform component is firmly clamped to the tree trunk 14 in its elevated position by means of a clamp assembly generally referred to by reference numeral 16. As shown in FIGURE 4, the hunting stand is assembled on the ground by interconnecting a plurality of ladder sections including the top section 18, the bottom section 20 and a plurality of intermediate sections 22 in order to form the ladder assembly. The top section 18 of the ladder assembly is pivotally connected to the platform component 10 so that when it is unfolded it may be interconnected with the ladder assembly at the proper angle to form a rigid assembly utilizing a pair of angle iron brace members 24 which extend between the bottom of the platform component and the vertical angle rails 26 of the top section 18. It will be apparent, that when the bracing member 24 and ladder sections are disassembled, the platform component 10 is folded against the top section 18 of the ladder assembly and the other sections of the ladder assembly stacked thereagainst to form a compact arrangement held together by a strap 28 as shown in FIGURES 2 and 3. Also held together with the disassembled parts are a pair of wheel assemblies 30 as shown in FIGURE 3, to be utilized in connection with the conversion of the hunting stand to a litter carrying device as will be hereinafter explained. Thus, all of the parts necessary to form the basic hunting stand and litter carrying device, may be stored and carried within a suitcase for example.

In order to assemble the hunting stand, the various sections of the ladder assembly are interconnected in overlapping relation to each other as shown in FIGURES 1 and 4.

Each section therefore includes ladder rungs 32 which interconnect the angle rail members 26. The rail members 26 in each ladder section are progressively spaced closer together by the rungs 32 beginning with the widest bottom section 20 so that the adjacent end portions of the ladder sections may be received within each other in overlapping relation. Referring now to FIGURES 7 through 9, it will be observed that each of the end portions of the side rail members 26 is provided with an end slot 34 within which the shoulder portion 36 of a bolt 38 is received, the bolt 38 being mounted by and projecting from the overlapping end portion of the rail member of an adjacent ladder section which is similarly provided with an end slot 34' in order to receive the shouldered portion of a bolt 38' which is mounted by and projects from the same rail member within which the end slot 34 is formed. It will therefore be apparent, that the slots 34 and 34' and bolts 38 and 38' form a slidable connection between adjacent overlapping rail members 26 limiting relative displacement between the ladder sections in one direction or downwardly when the ladder assembly is in the erected position shown in FIGURE 1. Also formd in the overlapping rail members on legs at right angles to the legs within which the slots and bolts are mounted, are a pair of aligned apertures 40 and 40' for purposes to be hereafter explained in connection with the conversion of the hunting stand to the litter carrying device.

Aside from the slight difference in lateral width of the ladder sections, the ladder sections are similar in construction to each other except that the bottom section 20 is provided with a pair of ground engaging foot elements 42 pivotally connected to the lower ends of the rail members 26 in order to prevent sliding of the bottom of the ladder over the ground when in the erected position. The top section 18 of the ladder assembly on the other hand, is permanently connected to the platform component 10. Toward this end, the bottom of the platform panel is provided with a pair of downwardly projecting lugs 44 so as to established a pivotal connecting axis adjacent to and parallel to the edge 46 of the panel opposite the abutment edge 48 from which the jaw assembly 16 projects. The platform panel may be made from a rectangular piece of plywood 50 faced on either side by sheets of aluminum 52 as shown in FIGURE 12, with angle members 54 secured to the opposite longitudinal edges by fasteners 56 in order to form a more rigid assembly. The lugs 44 are provided with apertures through which pivot elements 58 extend for pivotally connecting the platform panel to the upper end of the ladder assembly. Wing nut connections 60 as shown in FIGURES 4 and 5 are also mounted by the platform panel in order to connect the platform to the upper ends of the angle brace members 24, the lower ends thereof being pivotally connected by wing nut connectors 62 to the side legs of the rail members 26 of the top section 18.

Referring now to FIGURES 5 and 6 in particular, it will be observed that the jaw assembly 16 includes a pair of jaw members 64 having arcuate toothed portions 66 spaced from the abutment edge 48 of the platform panel and pivotally connected to the bottom of the platform panel by the straight angle portions 68. Angle members 70 are also connected to the jaw members 64 and extend over the top of the platform panel so as to form with the straight portions 68, a pivotal connection to the platform panel at the pivot locations 72. The angle members 70 are interconnected adjacent the pivot connections 72 by a spring 74 operative to continuously urge the arcuate tooth portions 66 of the jaw members 64 toward each other in order to embrace a tree trunk. A second pair of arcuate link jaw members 76 are pivotally interconnected with each other at a toggle joint 78 and pivotally connected to the jaw members 64 by the pivot pins 80. Also connected to the toggle joint 78, is a guide rod 82 slidably mounted within a guide tube 84 secured to the bottom of the platform panel. The guide rod 82 will therefore guide movement of the toggle joint 78 between an open position for the clamp assembly as shown in FIGURE 5 and a clamping position such as shown in FIGURE 6.

In the open position, the jaw members 76 are disposed between the abutment edge 48 of the platform panel and the toothed portions 66 of the jaw members 64 and are also disposed substantially parallel to the spring 74. Accordingly, the toggle joint 78 will be in an over-center position to hold the jaw members 64 spread apart as shown in FIGURE 5. The jaw members 64 may be manually spread apart to this position just prior to erection of the assembled hunting stand. Thus, when the platform component of the hunting stand is pushed against the tree trunk 14, the toggle joint is displaced rearwardly by the tree trunk past the overcenter position so that the spring 74 may then snap the jaw members 64 and 76 into gripping engagement with the tree trunk, the toggle joint 78 then being received within the notch 86 formed in the abutment edge 48 as shown in FIGURE 6. In order to prevent any unintentional opening of the jaw assembly, the remote ends of the jaw members 64 are interconnected by the strap 28 as also shown in FIGURE 6. Toward this end, the strap is removably anchored to the remote ends of the jaw members 64 by the spring clips 88 and the length of the belt adjusted by means of the buckle 90.

If desired an enclosure framework 92 may be mounted on top of the hunting stand as shown in FIGURE 14. The enclosure framework includes an annular frame member 94 having downwardly extending frame supports 96 and 98 respectively secured by fasteners 100 and 102 to the platform component 10 and the side rail members 26 of the ladder assembly. A camouflaged flexible curtain wall 104 as shown by dotted line in FIGURE 14 may be suspended from the frame member 94 in enclosing relation to the platform component 10 in order to conceal a sportsman. The frame member 94 which is spaced above the platform and spaced radially outward therefrom, also forms a suitable gun rest for the sportsman. The curtain wall is provided with a foldable flap 106 aligned with the ladder assembly in order to provide access to or exit from the enclosure. Further, a roof enclosure 108 may be mounted on top of the framework 92 including the peripheral frame member 110 supported by the spacing supports 112 and 114 on top of the frame member 94. A water repellant covering material 116 as shown by dotted line in FIGURE 14 may therefore be mounted between the frame members 110 and 94 in order to provide a protective head covering for the sportsman. Accordingly, fasteners 118 are provided for removably securing the roof enclosure framework 108 to the frame member 94. If desired, a chair or stool (not shown) may be secured to the platform component to permit hunting in a sitting or resting position.

As hereinbefore indicated, the hunting stand may be converted to a litter carrying device. Toward this end, one or more intermediate ladder sections 22 may be secured to the top section 18 by means of the slidable connections formed by the slots and shouldered bolts as described in connection with FIGURES 7 through 9, the number of intermediate sections utilized depending upon the desired length of the litter carrying device. The platform component is then folded against the top section of the ladder assembly and the end of the ladder assembly, to which the platform component is connected, is supported by means of the wheel assemblies 30 as shown in FIGURE 10. Each wheel assembly 30 as more clearly seen in FIGURE 11, includes an arcuate channel member or skid element having a web portion 120 and a pair of leg portions 122 extending perpendicular therefrom. The leg portions 122 straddle the rail members 26 of the ladder section 18 so that the wheel assemblies may be pivotally connected by the wing nut assemblies 124 adjacent the forward ends 126 thereof to the rail members 26. One of the leg portions 122 of each wheel assembly is also pivotally connected by a bolt fastener 128 to the end portion of a rail member adjacent the rear end of the wheel assembly. The leg portions 122 also extend beyond the web portion 120 so that they may rotatably mount a wheel 130 on the axle bolt assembly 132. Thus, wheeled support will be provided for the litter carrying device. Alternatively, the wheels 130 may be removed and ground support provided by the web portion 120 over soft ground or snow for example. Toward this end, the web portion 120 is coated on the underside thereof with a rigid plastic material 134 as shown in FIGURE 12 in order to form a runner surface.

When utilized as a litter carrying device, the ladder sections 18 and 22 are prevented from separating from each other by interconnecting the rail members 26 with the removable clip elements 88 of the strap 28, the clip elements 88 extending through the aligned apertures 40 and 40' as more clearly seen in FIGURE 13. The strap sections may then also be utilized to secure either equipment or game on the litter device for transport purposes. Thus, the sportsman after completing all activity in connection with the hunting stand, may convert the hunting stand into the litter carrying device for the aforementioned purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hunting stand including a platform having an abutment edge, a ladder assembly connected to the platform, clamp means mounted by the platform for displacement between an open position and a clamping position embracing a tree, and means connected to the clamp means for biasing the clamp means to the clamping position in response to displacement of the platform against the tree when the clamp means is in the open position, said clamp means comprising, a first pair of jaws pivotally connected to the platform having teeth spaced from the abutment edge of the platform and a second pair of jaws pivotally interconnected with the toggle means and the first pair of jaws between the platform and the teeth on said first pair of jaws.

2. The combination of claim 1 wherein said biasing means includes, a toggle joint pivotally interconnecting said second pair of jaws, a spring interconnecting said first pair of jaws, and guide means mounted on the platform and connected to the toggle joint for guiding movement of the second pair of jaws to the open position of the clamp means holding the same in the open position against the bias of said spring, said second pair of jaws extending from the toggle joint substantially parallel to the spring in said open position, said abutment edge of the platform having a notch within which the toggle joint is received when the platform is displaced against the tree.

3. The combination of claim 1 wherein said platform is pivotally connected to the ladder assembly, said clamp means being mounted on the platform adjacent to the abutment edge and brace means interconnecting the platform and the ladder assembly at an angle for supporting the platform in an elevated position against the tree.

4. The combination of claim 3 wherein said biasing means includes, a toggle joint pivotally interconnecting said second pair of jaws, a spring interconnecting said first pair of jaws, and guide means mounted on the platform and connected to the toggle joint for guiding movement of the second pair of jaws to the open position of the clamp means holding the same in the open position against the bias of said spring, said second pair of jaws extending from the toggle joint substantially parallel to the spring in said open position, said abutment edge of the platform having a notch within which the toggle joint is received when the platform is displaced against the tree.

5. The combination of claim 4 wherein said ladder assembly includes at least two sections, means pivotally connecting one of said sections to the platform about an axis parallel spaced from the abutment edge thereof and slidable connecting means mounted by overlapping end portions of said sections for limiting relative displacement in one direction to form a rigid assembly.

6. The combination of claim 1 wherein said biasing means includes, a toggle joint operatively connected to the clamp means and the platform and a spring connected to the clamp means urging the same to the open or clamping positions.

7. A hunting stand and litter carrying device comprising a platform, a ladder assembly including at least two sections, means pivotally connecting one of said sections to the platform, disconnectible means interconnecting said sections, a pair of curved skid elements, and means pivotally connecting said elements at two locations adjacent to the pivotal connection between the one section of the ladder assembly and the platform for support thereof on the ground.

8. The combination of claim 7 wherein said skid elements include extensions projecting from the platform and the ladder assembly and wheel means rotatably mounted by said extensions.

9. The combination of claim 7 wherein said platform is provided with an abutment edge, said ladder assembly including at least two sections, said pivotal connecting means connecting said one of the sections to the platform about an axis parallel spaced from the abutment edge thereof, and said disconnectible means including slidable connecting means mounted by overlapping end portions of said sections for limiting relative displacement in one direction to form a rigid assembly, and a strap having removable anchoring portions, said overlapping end portions of the sections having aligned apertures receiving said removable anchoring portions of the strap to prevent separation of the sections in the opposite direction of relative displacement therebetween.

References Cited

UNITED STATES PATENTS

| 1,221,579 | 4/1917 | Olds | 182—20 |
| 2,555,782 | 6/1951 | Brownstein | 182—178 |
| 3,028,929 | 4/1962 | Chubbs | 182—214 |
| 3,057,431 | 10/1962 | George | 182—116 |
| 3,116,808 | 1/1964 | Riley | 182—129 |
| 3,220,766 | 11/1965 | Kates | 182—20 |
| 3,282,375 | 11/1966 | Ray | 182—214 |

FOREIGN PATENTS 1,118,135  3/1956  France.

REINALDO P. MACHADO, *Primary Examiner.*